United States Patent Office 2,828,668
Patented Apr. 1, 1958

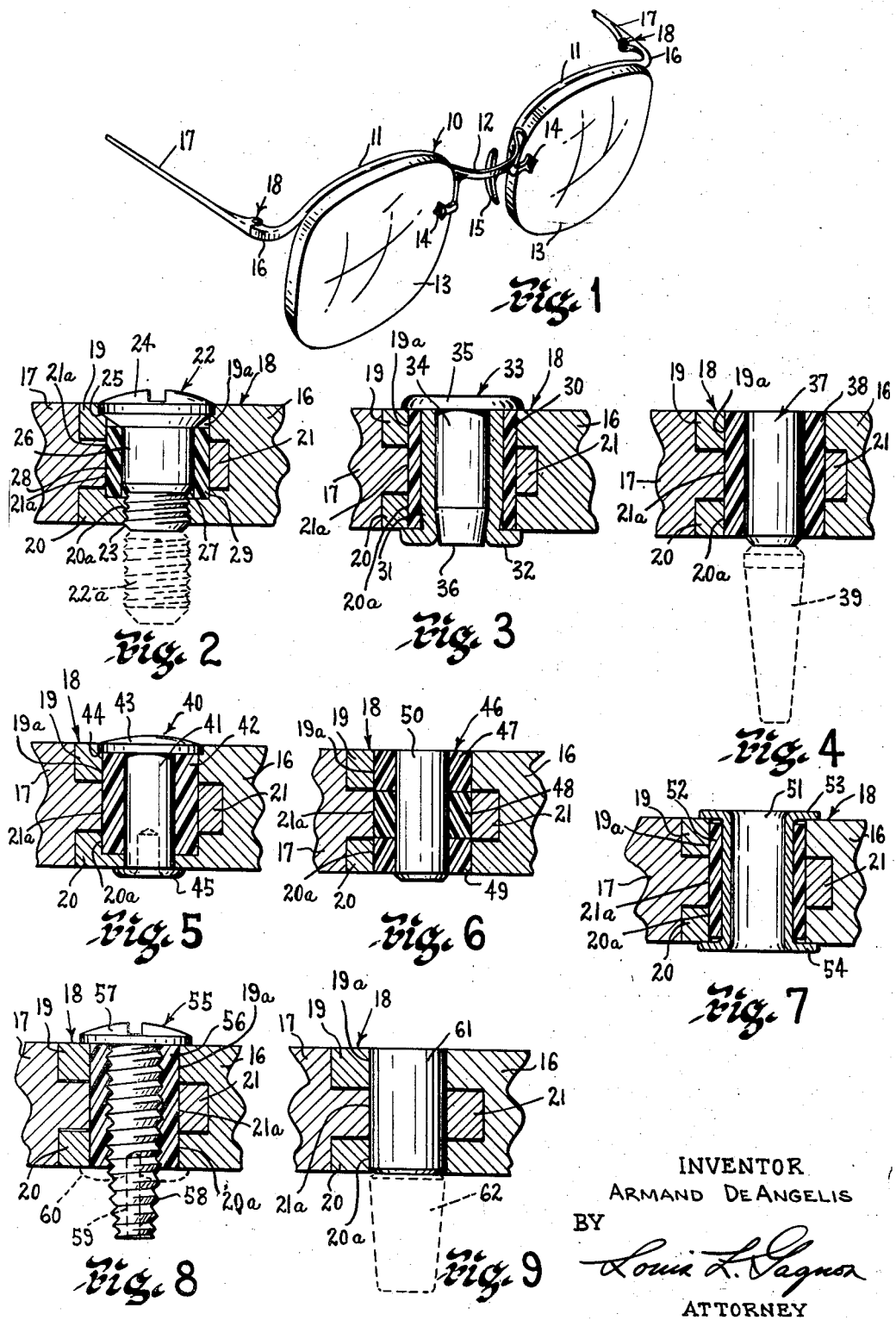

2,828,668

OPHTHALMIC MOUNTINGS

Armand De Angelis, Southbridge, Mass., assignor to American Optical Company, Southbridge, Mass., a voluntary association of Massachusetts Application December 15, 1951, Serial No. 261,795

9 Claims. (Cl. 88—53)

This invention relates to improvements in ophthalmic mountings and has particular reference to novel hinge means for connecting temples to the supporting frames of ophthalmic mountings and method of making same.

One of the primary objects of this invention is to provide a novel, simple and inexpensive device and method of making the same for use in temple hinge connections of ophthalmic mountings whereby the temples will be more efficiently retained in desired adjusted open or spaced relation without undue "dropping" or binding.

Another object is to provide an ophthalmic mounting with a temple hinge connection wherein compressible means is mounted in encircling relation with the pivot member for aiding in frictionally retaining the temples in adjusted positions.

Another object is to provide a hinge connection of the above character wherein said compressible means is in the form of a nylon bushing which encircles the pivot member and, through its permanent inherent resiliency, frictionally grips the pivot member and prevents undesired free swinging movement of the temples on the hinges or binding thereof.

Further objects and advantages of the invention will become apparent from the following description taken in connection with the accompanying drawing, in which:

Fig. 1 is a perspective view of an ophthalmic mounting embodying the invention;

Figs. 2 through 8 are enlarged fragmentary vertical sectional views taken through the temple hinge connection of the mounting shown in Fig. 1 and illustrating the invention as applied to various temple hinge connections; and Fig. 9 is a similar view of a modification of the invention.

In the manufacture of ophthalmic mountings, it is desirable that the temple hinges be so constructed that the temples will not "drop"; that is, the temples, when opened or spread at any desired angle with respect to the plane of the lenses, will be retained in their adjusted positions and will not be free to swing on the hinges except when force is applied thereto. Also, it is desirable that the hinges be so constructed that the parts will not bind or "freeze" after considerable use.

Various means have been devised in attempting to overcome "dropping" of the temples and binding of the hinges including the provision of friction members, springs and other mechanical devices many of which are intricate and complicated and, consequently, difficult as well as expensive to manufacture.

Referring to the drawing wherein like characters of reference designate like parts throughout the several views, Fig. 1 illustrates one type of ophthalmic mounting which embodies the invention and which comprises a frame 10 which embodies a pair of spaced transverse arms 11 which are connected together by a bridge member 12, the arms 11 being elongated and shaped to the upper contour shape of spaced lenses 13. The lenses 13 are supported by strap members 14 which extend from the bridge 12. The entire mounting is adapted to be supported upon the nose of a wearer by means of nose pads 15 carried by guard arms (not shown) and which are attached to the mounting adjacent the bridge 12.

Each of the transversely extending arms 11 terminate in rearwardly directed endpieces 16 to which temples 17 are secured by hinges 18. The extreme end of each endpiece 16 is bifurcated to form a pair of spaced ears 19 and 20 which are adapted to receive therebetween an ear 21 provided on the adjacent end of the respective temple 17. The ears 19, 20 and 21 are each provided with concentric aligned openings 19a, 20a and 21a respectively therethrough for reception of a pivot member such as screw 22.

The screw 22 is provided with a threaded portion 23 adjacent one end thereof, which portion 23 is threadedly secured in the opening 20a in the lower ear 20 of the endpiece 16. The opposed end of the screw 22 is provided with a head 24 which is adapted to engage the upper surface of the upper ear 19 or more particularly, as is shown in Fig. 2, is positioned within a countersink 25 formed in said ear 19. Intermediate said threaded portion 23 and head 24 of the screw 22 is a shank portion 26 which is adapted to be positioned within the openings 19a and 21a in the ears 19 and 21. The shank portion 26 is of a diameter slightly larger than the diameter of the threaded portion 23 and is connected thereto by a tapered portion 27. The aligned openings 19a and 21a in the ears 19 and 21 are of a diameter greater than the diameter of the opening 20a in ear 20 and are adapted to receive therein a bushing 28, which bushing is adapted to encircle the shank portion 26 of the screw 22, as shown in Fig. 2. The shelf 29 thus formed in the ear 20 by the opening 20a therein serves to prevent retraction of the bushing 28 in a direction away from the head 24 of the screw 22, while the head 24 itself prevents retraction of the bushing 28 in the opposite direction.

The bushing 28 is formed of a compressible material characterized by its inherent resiliency and ability when deformed to tend to return to its initial size and shape, and is also characterized by its toughness and durability. Such a bushing is preferably formed of nylon but may be made of similar material having the desired characteristics.

The bushing 28 is provided with an outside diameter approximately the same as the diameter of the openings 19a and 21a in ears 19 and 21 and an inside diameter which is slightly smaller than the diameter of the shank portion 26 of the screw 22. In assembling the structure, the ears 19, 20 and 21 are positioned in such manner that the openings therethrough are aligned and the bushing 28 is then inserted therein. Following this, the screw having an initially long lead portion 22a is inserted and threaded into the opening 20a in ear 20 whereupon the tapered portion 27 will direct the shank portion 26 of the screw 22 into the bushing 28, forcibly compressing the bushing against the walls of the openings 19a and 21a whereupon the screw can be tightened down to a position where the head 24 is in engagement with the countersink 25. The exposed long lead portion 22a of the screw is then removed, as indicated by dotted lines in Fig. 2.

In such a construction, the inherent resiliency of the material of the bushing 28 creates sufficient friction upon the shank portion 26 of the screw to retain the temples in any desired adjusted angular position with respect to the plane of the lenses 13. Also, binding or "freezing" of the movable parts will not occur as sometimes is the case when hinges are formed entirely of engaging metal parts.

Although the endpiece 16 has been described as having spaced ears 19 and 20 between which the single ear 21 of the temple is positioned it is to be understood that the temple may be provided with spaced ears between which a single ear on the endpiece may be positioned or several interfitting ears may be formed on both the temple and endpiece. This applies to all structures shown and described herein.

In the construction shown in Fig. 3, the ears 19, 21 and 20 are provided with aligned openings 19a, 21a and 20a respectively therethrough, which openings are all of substantially the same diameter. Positioned within the openings is a bushing 30 formed of nylon or similar material which extends throughout the entire lengths of the openings and has inserted therein a cylindrical metallic friction member 31, the outside diameter of the friction member 31 being initially substantially equal to or slightly smaller than the inside diameter of the bushing 30. The lower end of the friction member 31 is provided with an annular flange 32 which is directed outwardly thereof and adapted to overlie the lower end of the bushing 30 to aid in retaining the bushing 30 in place. A stud 33 of metal or other rigid material is adapted to be inserted into the cylindrical member 31 and is provided with a shank portion 34 having an outside diameter slightly larger than the inside diameter of the cylindrical member 31 and is provided at one end with a flat head 35 and at its other end with a tapered portion 36. Thus, to assemble the device the tapered portion 36 of the stud 33 is inserted within the cylindrical member 31 and upon application of force to the stud the tapered portion 36 will lead the shank portion 34 into the member 31 causing the member 31 to expand and to compress the bushing 30 against the walls of the openings in the ears 19, 21 and 20 to introduce the desired friction and prevent the so-called "drop temple" defect while obviating the binding or freezing of the pivotal movement of the temple.

Fig. 4 discloses a construction generally similar to the construction shown in Fig. 3 with the exception that the stud of metal or other rigid material, which in this case in indicated by numeral 37 is inserted directly into the bushing 38 of nylon or similar material and, having an outside diameter slightly larger than the inside diameter of the bushing 38, the said stud 37 will force the bushing outwardly against the walls of the openings 19a, 21a and 20a in the ears 19, 21 and 20 respectively and introduce the desired frictional function. The stud 37 is initially provided with an elongated tapered portion 39 as indicated by dotted lines in Fig. 4 whereby the tapered portion 39 will, upon application of inward force, lead the stud 37 into the bushing 38 and is thereafter adapted to be removed as by cutting.

Fig. 5 is generally similar to the arrangement shown in Fig. 2 with the exception that instead of a screw, the hinge pivot member 40 consists of a solid headed metallic stud having a shank portion 41 which is adapted to be inserted into the bushing 42 of nylon or similar material, with its head portion 43 being subsequently located in a countersink 44 provided therefor in ear 19. The stud 40 is also provided with an outside diameter larger than the inside diameter of the bushing 42 and, therefore, in the assembled structure compresses the bushing 42, forcing it against the walls of the openings 19a, 21a and 20a to provide the desired frictional engagement.

The pivot member 40 is prevented from being retracted by means of a flange 45 formed on its opposed end by peening or the like after assembly.

The device shown in Fig. 6 is substantially the same as the arrangement of Fig. 4, the compressible bushing 46 in this case being in the form of 3 separate annular members 47, 48 and 49 each of which is formed of nylon or similar material and is of a controlled length substantially equal to the thickness of the respective ears 19, 21 and 20. The pivot pin 50 which is normally larger in diameter than the central openings in the annular members 47, 48 and 49 will, upon insertion within the member 47, 48 and 49, compress the members in the manner described above with respect to the arrangement shown in Fig. 4.

Referring to Fig. 7 the pivot member 51 embodies a cylindrical tubular member of metal or other substantially rigid material which is inserted into the nylon bushing 52 and subsequently flanged at each end as indicated at numerals 53 and 54 to prevent disassembly of the respective parts of the hinge. In this structure the pivot member 51 is also provided with an outside diameter larger than the inside diameter of the bushing 52 whereby the bushing 52 will be urged into the desired intimate frictional engagement with the walls of the openings 19a, 21a and 20a.

In Fig. 8 the pivot member 55 is in the form of a heavy self-threading screw which is adapted to be screwed into the bushing 56 to compress the same in the manner described above, one end of the screw 55 being provided with a head 57 and the opposed end thereof being provided with a tapered portion 58 having an internal bore 59 therein whereby the tapered portion 58 may be subsequently peened or otherwise flared outwardly to form an annular flange 60 as shown by dotted lines.

Referring now to the modification shown in Fig. 9, the hinge ears 19, 21 and 20 are each provided with aligned openings 19a, 21a and 20a respectively of substantially equal diameter. Inserted within the openings is a pivot member 61 formed as a solid piece of nylon which is initially formed with an outside diameter slightly larger than the diameter of the openings. The pivot member 61 is also initially provided with a tapered portion 62 which is of a smaller diameter than the diameter of the openings and thereby, at assembly, will lead the pivot member 61 into the openings, whereupon the pivot member 61 will be compressed and will thus act efficiently in the manner desired. The tapered portion 62 is adapted to be removed as by cutting when the pivot member 61 is in position of use.

In all the embodiments of the invention shown in Figs. 2 through 8 the compressible bushing which encircles the pivot member will frictionally act to retain the temples in desired adjusted open or spaced relation with respect to the plane of the lenses without permitting undue "dropping" or binding. A similar result is obtained by the modified construction shown in Fig. 9 wherein the pivot member 61 will similarly frictionally restrain the temples from undesired free swinging movement about the hinges.

From the foregoing it will be apparent that all of the objects and advantages of the invention have been accomplished. It will be apparent, however, that many changes may be made in the details of construction, arrangement of parts, and method shown and described without departing from the spirit of the invention as expressed in the accompanying claims. Therefore it is to be understood that all matter set forth or shown in the accompanying drawing is to be interpreted as illustrative and not in a limiting sense.

I claim:

1. An ophthalmic mounting comprising a frame embodying a pair of spaced lenses, lens supporting members carrying said lenses, a bridge joining said lens supporting members, temples connected to the outer sides of said lens supporting members, and hinge means for pivotally connecting said temples to said lens supporting members comprising a plurality of interfitting apertured metallic ears provided on the adjoining portions of said lens supporting members and temples, a pivot member within the apertures in said ears, said pivot member being in the form of a solid headed metal pin having one end tapered, a flexible tubular retainer encircling said pivot member within said apertures, and a friction member of nylon tightly positioned within said apertures and in closely encircling relation with said flexible tubular retainer, said friction member being characterized by its inherent resiliency and ability to return to its initial size and shape when altered therefrom, said flexible tubular retainer having an initial inside diameter smaller than the outside diameter of said pivot member, and said pivot member causing said retainer to expand and compress said friction member to frictionally retain the temples in desired adjusted positions about said hinge means and to be free to swing only when force is exerted thereon.

2. In an ophthalmic mounting embodying a frame comprising a pair of spaced lens supporting members having lenses attached thereto, a bridge connecting said lens supporting members and temples attached to the outer sides of said lens supporting members, hinge means for pivotally connecting said temples to said lens supporting members comprising a plurality of interfitting apertured relatively rigid ears provided on the adjoining portions of said lens supporting members and temples, a relatively rigid pivot member within the apertures in said ears, said pivot member being in the form of a solid headed pin having one end tapered, a flexible tubular retainer encircling said pivot member within said apertures, and a friction member of nylon tightly positioned within said apertures and in closely encircling relation with said retainer, said friction member being characterized by its inherent resiliency and ability to return to its initial size and shape when altered therefrom, said flexible tubular retainer having an initial inside diameter smaller than the outside diameter of said pivot member and said pivot member causing said retainer to expand and compress said friction member to frictionally retain the temples in desired adjusted positions about the hinge means and to be free to swing only when force is exerted thereon.

3. A temple hinge connection for an ophthalmic mounting embodying a pair of lens supporting members and temples connected to the ends of said lens supporting members, said hinge connection comprising a plurality of interfitting apertured ears provided on the adjoining portions of said lens supporting members and temples, a pivot member within the apertures in said ears, said pivot member being in the form of a solid headed pin, a flexible tubular retainer encircling said pivot member within said apertures, and a friction member tightly positioned within said apertures and in closely encircling relation with said retainer, said friction member being characterized by its inherent resiliency and ability to return to its initial size and shape when altered therefrom, and said pivot member compressing and expanding said retainer sufficiently to cause said friction member to frictionally engage the sides of the apertures in said ears and yieldably restrain the temples when so assembled against undesired free movement on said pivot member.

4. A hinge connection for connecting the temples to a supporting part of an ophthalmic mounting, said hinge connection comprising a plurality of interfitting ears provided on the adjoining portions of said temples and said supporting part and having substantially aligned opening therein and a pivot member within said openings, said pivot member comprising an inner metallic tubular member of an initial substantially uniform diameter and having at least one end thereof flanged to overlie the edge of the opening in an adjacent outer ear and a bushing of nylon material on said tubular member characterized by its inherent resistance to wear and its tendency to return to its initial shape when altered, said bushing lying between said tubular member and the inner side surfaces of said openings in said ears and being initially of a diameter slightly less than the diameter of said openings to permit ease of insertion of said pivot member in said openings, said metallic tubular member, throughout the major portion of the length thereof within said openings and spaced inwardly of the flanged end, being expanded to an increased diameter by forcing a metallic pin of a given diameter greater than the bore of the metallic tubular member and having a tapered lead end inwardly of said tubular member, said expanded portion exerting and retaining a compressing force on said nylon bushing and the inherent tendency of said material to return to its initial shape in turn exerting and retaining a frictional restraining action on the temples against free swinging movement about the hinge connection.

5. A hinge connection for connecting a temple to a supporting part of an ophthalmic mounting, said hinge connection comprising a plurality of interfitting ears provided on the adjoining portions of said temple and said supporting part and having substantially aligned openings therein and a pivot member within said openings, said pivot member comprising a bushing of plastic material characterized by its expandability, its inherent resistance to wear and its tendency to return to its initial shape when altered therefrom, said bushing, throughout the major portion of its length, having an outer surface initially cylindrical in shape and having a solid undivided wall of a substantially uniform outer diameter which is such as to initially permit ready insertion thereof in said aligned openings and having a central bore extending longitudinally thereof, and a member formed of material which will retain the shape to which it is formed positioned inwardly of said bore and, throughout the major portion of the length of the bushing, said member having a cylindrically shaped body portion of a controlled diameter greater than the initial minimum diameter of said bore thereby displacing material of the inner portion of the bushing in a sidewise direction in response to the outward compressing action of said member in said bore, and said member being of a rigidity sufficient to retain said compressing force on said bushing to cause an outer surface portion thereof to exert a given force on and to relatively intimately frictionally contact the adjacent inner surface areas of the openings, said friction being of a fixed non-variable amount controlled by the related diameter of said body portion and the minimum diameter of the bore, the extent of said displacement of the material of the inner portion of the bushing being only of an amount sufficient to restrain the temples against free swinging movement except when force is applied thereto and to retain said frictional restraining action on said temple with substantially no binding or freezing of the movable parts.

6. A hinge connection for connecting a temple to a supporting part of an ophthalmic mounting, said hinge connection comprising a plurality of interfitting ears provided on the adjoining portions of said temple and said supporting part and having substantially aligned openings therein and a pivot member within said openings, said pivot member comprising a bushing of nylon material characterized by its expandability, its inherent resistance to wear and its tendency to return to its initial shape when altered therefrom, said bushing, throughout the major portion of its length, having an outer surface initially cylindrical in shape and having a solid undivided wall of a substantially uniform outer diameter which is such as to initially permit ready insertion thereof in said aligned openings and having a central bore extending longitudinally thereof, and a member formed of material which will retain the shape to which it is formed positioned inwardly of said bore and, throughout the major portion of the length of the bushing, said member having an enlarged head adjacent one end thereof and a cylindrically shaped body portion of a controlled diameter greater than the initial minimum diameter of said bore thereby displacing material of the inner portion of the bushing in a sidewise direction in response to the outward compressing action of said member in said bore, and said member being of a rigidity sufficient to retain said compressing force on said bushing to cause an outer surface portion thereof to exert a given force on and to relatively intimately frictionally contact the adjacent inner surface areas of the openings, said friction being of a fixed non-variable amount controlled by the related diameter of the body portion and the minimum diameter of the bore, the extent of displacement of the material of the inner portion of the bushing being only of an amount sufficient to restrain the temples against free swinging movement except when force is applied thereto and to retain said frictional restraining action on said temple with substantially no binding or freezing of the movable parts.

7. A hinge connection for connecting a temple to a supporting part of an ophthalmic mounting, said hinge connection comprising a plurality of interfitting ears provided on the adjoining portions of said temple and said supporting part and having substantially aligned cylindrically shaped openings therein and a pivot member within said openings, said pivot member comprising an inner metallic tubular member of initially substantially uniform diameter throughout the major portion of the length of the openings and having a continuous solid wall and a bushing of plastic material having a continuous solid wall on said tubular member, said wall of said bushing normally being of a thickness to substantially span the space between said tubular member and the inner walls of the openings, said material of said bushing being inherently resistant to wear and having a tendency to return to its initial shape when altered therefrom, said metallic tubular member having an exterior diameter substantially the same as the interior diameter of the bushing and having the major portion of its length inwardly of said openings expanded subsequent to insertion in said bushing by outward stretching of the material thereof to an increased diameter to exert and retain a sidewise compressing force on said plastic bushing to cause it to frictionally contact the inner surfaces of the openings and the outer surface of said tubular member by an amount sufficient to restrain the temples against undesired free swinging movement and with the inherent tendency of the material of said bushing to return to its initial shape functioning to compensate for wear and to retain said frictional restraining action.

8. A hinge connection for connecting a temple to a supporting part of an ophthalmic mounting, said hinge connection comprising a plurality of interfitting ears provided on the adjoining portions of said temple and said supporting part and having substantially aligned cylindrically shaped openings therein and a pivot member within said openings, said pivot member comprising an inner metallic tubular member initially of substantially uniform diameter throughout the major portion of the length of the openings and having a continuous solid wall and a bushing of nylon material on said tubular member and having a continuous solid wall initially of substantially uniform diameter throughout its length, said wall of said bushing normally being of a thickness to substantially span the space between said tubular member and the inner walls of the openings, said material of said bushing being inherently resistant to wear and having a tendency to return to its initial shape when altered therefrom and said metallic tubular member having an exterior diameter substantially the same as the interior diameter of the bushing and having the major portion of its length inwardly of said openings expanded subsequent to insertion in said bushing by outward stretching of the material thereof to an increased diameter to exert and retain a sidewise compressing force on said nylon bushing to cause it to frictionally contact the inner surfaces of the openings and the outer surface of said tubular member by an amount sufficient to restrain the temples against undesired free swinging movement and with the inherent tendency of the material of said bushing to return to its initial shape functioning to compensate for wear and to retain said frictional restraining action.

9. A hinge connection for connecting a temple to a supporting part of an ophthalmic mounting, said hinge connection comprising a plurality of interfitting ears provided on the adjoining portions of said temple and said supporting part and having substantially aligned openings therein and a pivot member within said openings, said pivot member comprising an inner metallic tubular member having at least one end thereof flanged to overlie the adjacent annular edge of the opening in one of the outer ears and a bushing of nylon material on said tubular member and normally being of a thickness to substantially span the space between said tubular member and the inner walls of the openings, said material of said bushing being inherently resistant to wear and having a tendency to return to its initial shape when altered therefrom, said metallic tubular member having an exterior diameter substantially the same as the interior diameter of the bushing and having a portion adjacent said flanged end of a diameter similar to said exterior diameter and the remainder thereof expanded subsequent to insertion in the bushing by outward stretching of the material thereof to an increased diameter to exert and retain a sidewise compressing force on said nylon bushing to cause it to compress and to frictionally contact the inner surfaces of the openings and the outer surface of said tubular member by an amount sufficient to restrain the temples against undesired free swinging movement and with the inherent tendency of the material of said bushing to return to its initial shape functioning to compensate for wear and to retain said frictional restraining action.

References Cited in the file of this patent

UNITED STATES PATENTS

| 618,118 | Moews | Jan. 24, 1899 |
| 763,220 | Toten | June 21, 1904 |
| 1,384,303 | Clulee | July 12, 1921 |
| 1,471,009 | Schumacher | Oct. 16, 1923 |
| 1,530,604 | Koehler | Mar. 24, 1925 |
| 1,779,789 | Wells et al. | Oct. 28, 1930 |
| 2,698,958 | Adams | Jan. 11, 1955 |

FOREIGN PATENTS

| 357,177 | Italy | Mar. 5, 1938 |